US008065048B2

(12) United States Patent
Bertosa et al.

(10) Patent No.: US 8,065,048 B2
(45) Date of Patent: Nov. 22, 2011

(54) AUTOMATICALLY IDENTIFYING VOLVO COMMUNICATION PROTOCOLS METHOD AND APPARATUS

(75) Inventors: Thomas Bertosa, Chardon, OH (US); Michael Gessner, Akron, OH (US); Neil Somos, Brecksville, OH (US)

(73) Assignee: SPX Corporation, Charlotte, NC (US)

( * ) Notice: Subject to any disclaimer, the term of this patent is extended or adjusted under 35 U.S.C. 154(b) by 1229 days.

(21) Appl. No.: 11/520,562

(22) Filed: Sep. 14, 2006

(65) Prior Publication Data

US 2008/0071439 A1 Mar. 20, 2008

(51) Int. Cl.
*G01M 17/00* (2006.01)
*G06F 7/00* (2006.01)
*G06F 19/00* (2011.01)

(52) U.S. Cl. ................ 701/29; 701/32; 701/33; 701/35; 702/183; 370/241

(58) Field of Classification Search ............. 701/29–35; 702/183, 184; 73/114.61; 370/241, 252; 340/439
See application file for complete search history.

(56) References Cited

U.S. PATENT DOCUMENTS 4,748,843 A * 6/1988 Schafer et al. ............. 73/114.61
4,853,850 A * 8/1989 Krass et al. ..................... 701/35
5,278,759 A * 1/1994 Berra et al. ....................... 701/1
5,541,840 A * 7/1996 Gurne et al. .................... 701/33
5,646,865 A * 7/1997 Alfaro et al. .................... 701/29
5,787,367 A * 7/1998 Berra ................................ 701/1
6,141,608 A * 10/2000 Rother ............................ 701/33
6,263,268 B1 * 7/2001 Nathanson ...................... 701/29
6,526,340 B1 * 2/2003 Reul et al. ....................... 701/29
6,603,394 B2 * 8/2003 Raichle et al. ................ 340/438
6,636,790 B1 * 10/2003 Lightner et al. ................ 701/33
6,701,233 B2 * 3/2004 Namaky et al. ................. 701/33
6,738,696 B2 * 5/2004 Oi .................................. 701/29
6,816,760 B1 * 11/2004 Namaky .......................... 701/29
6,928,349 B1 * 8/2005 Namaky et al. ................. 701/33
6,947,816 B2 * 9/2005 Chen .............................. 701/33
6,957,133 B1 * 10/2005 Hunt et al. ...................... 701/29
7,012,512 B2 * 3/2006 St. Denis ...................... 340/438
7,073,714 B2 * 7/2006 Namaky et al. .......... 235/462.15
7,257,472 B2 * 8/2007 Hauer et al. .................... 701/29
7,324,550 B2 * 1/2008 Klose et al. ................... 370/466
7,437,227 B2 * 10/2008 Andreasen et al. ............. 701/35
2002/0070851 A1 * 6/2002 Raichle et al. ................ 340/438
2005/0182535 A1 * 8/2005 Huang ............................ 701/29
2006/0101311 A1 * 5/2006 Lipscomb et al. .............. 714/47
2006/0123692 A1 * 6/2006 Beronja ............................ 43/61
2006/0149434 A1 * 7/2006 Bertosa et al. .................. 701/29
2006/0149437 A1 * 7/2006 Somos ............................ 701/29
2007/0032207 A1 * 2/2007 Shah ............................ 455/111
2007/0233340 A1 * 10/2007 Raichle et al. .................. 701/29

* cited by examiner

*Primary Examiner* — Khoi Tran
*Assistant Examiner* — Jamie Figueroa
(74) *Attorney, Agent, or Firm* — Baker & Hostetler LLP

(57) ABSTRACT

A diagnostic tool and method are provided that can determine the communication protocol being used by diagnostic systems in a vehicle. The tool can automatically communicate with onboard computer of the diagnostic system in a first communication protocol and if unsuccessful, then can communicate with the diagnostic system in a second communication protocol. The tool can also determine the Baud rate of the communication protocol being used by the onboard computer.

27 Claims, 3 Drawing Sheets

AUTOMATICALLY IDENTIFYING VOLVO COMMUNICATION PROTOCOLS METHOD AND APPARATUS

FIELD OF THE INVENTION

The present invention relates generally to an automotive diagnostic tool. More particularly, the present invention relates to an automotive diagnostic tool having Volvo communication protocols.

BACKGROUND OF THE INVENTION

Modern vehicles typically have one or more diagnostic systems, generally having separate computer control modules to control various functions of the vehicle. Some examples include powertrain control module (PCM), engine control module (ECM), a transmission control module (TCM), Anti-locking brake system (ABS), and an air bag control module. The vehicle diagnostic systems often have self-diagnostic capability to detect and alert the driver of problems the vehicle may be encountering. When a problem is found, a diagnostic trouble code or DTC, is set within the computer's memory. DTCs are as general or as specific as the manufacturer desires.

To retrieve and decipher DTCs, an auto repair technician needs a diagnostic tool. The diagnostic tool must, therefore, be connected to the vehicle's computer bus system to access and retrieve the DTCs. Scan tools are testing devices that interface with vehicle diagnostic systems to retrieve information from the various control modules. The scan tools are equipped to communicate in various communication protocols such as Controller Area Network (CAN), J1850 VPM and PWM, ISO 9141, Keyword 2000 and others. These communications protocols may be specific to the various automobile manufacturers. The scan tool will help the technician to diagnose and repair the vehicle based on the information the tool retrieves from it.

In some instances, manufacturers configure their onboard computers with proprietary protocols where a specialized diagnostic tool is required to communicate with that vehicle. Also, within a manufacturer's fleet of vehicles, certain models may use one communication protocol, while other models may use another communication protocol. Even within a given vehicle, modules may use different communication protocols. This further complicates matters and requires diagnostic tools capable of communicating with various modules and models. One such example is Volvo, who uses different protocols for different models and modules.

Accordingly, it is desirable to provide a method and apparatus that allows a diagnostic tool to successfully communicate with a Volvo vehicle, regardless of the protocol the particular Volvo model uses.

SUMMARY OF THE INVENTION

The foregoing needs are met, to a great extent, by the present invention, wherein in one aspect an apparatus is provided that in some embodiments automatically determines the proper communication protocol being used in a vehicle, such as a Volvo vehicle.

In accordance with one embodiment of the present invention, a diagnostic tool for identifying a vehicle's protocol is provided and can include a processor that can operate a software that can automatically determine the vehicle's protocol used by an electronic control unit of a diagnostic system in a vehicle under test, a memory that can store the software, a connector interface that can connect the tool to a data link connector in the vehicle, a signal translator that can allow the tool to communicate with the vehicle in at least one communication protocol, an input device that can input information into the tool, a display that can display information to the user, and a housing surrounding the processor, the memory, the connector interface, the signal translator, the input device and display.

In accordance with another embodiment of the present invention, a method for identifying a vehicle's protocol is provided and can include coupling a diagnostic tool to the vehicle, selecting at least one diagnostic system in the vehicle to query via a menu presented by the diagnostic tool, automatically communicate with an electronic control unit with the diagnostic tool using a first communication protocol, automatically communicate with a second communication protocol with the diagnostic tool when communicating with the first communication protocol is unsuccessful, and identifying the vehicle onboard computer's communication protocol.

In accordance with yet another embodiment of the present invention, an article is provided and can include a machine-accessible medium having associated data, wherein the data, when accessed, results in a machine which can perform providing at least one diagnostic system in a vehicle to query via a menu presented by a diagnostic tool, automatically communicating with a vehicle onboard computer with the diagnostic tool using a first communication protocol after receiving the selection of the diagnostic system, automatically communicating with a second communication protocol with the diagnostic tool when communicating with the first communication protocol is unsuccessful, and identifying the vehicle onboard computer's communication protocol.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
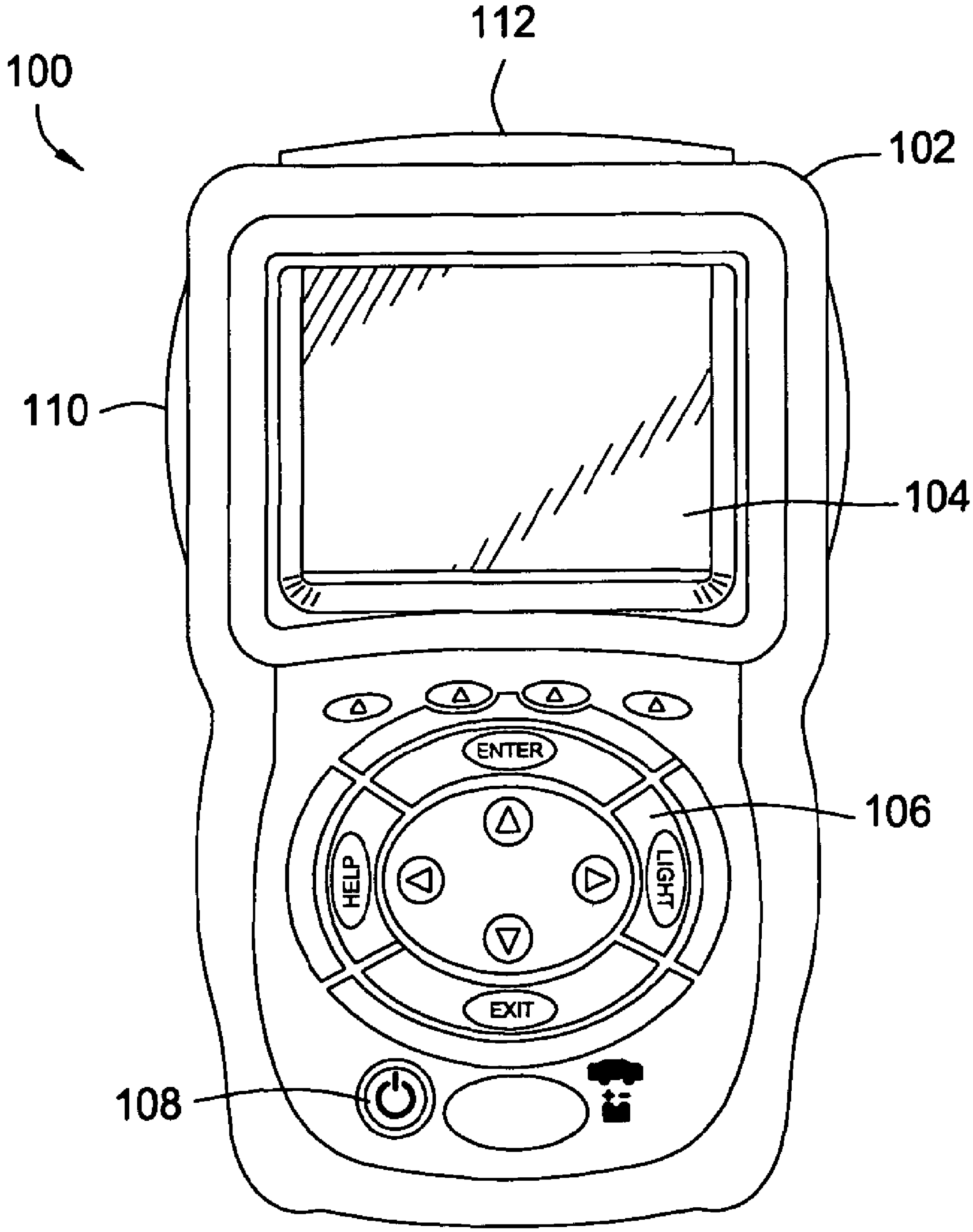
FIG. 1 is a front view illustrating a diagnostic tool according to an embodiment of the invention.

The invention will now be described with reference to the drawing figures, in which like reference numerals refer to like parts throughout. An embodiment in accordance with the present invention provides an apparatus and method to automatically detect the proper Volvo protocol for any Electronic Control Unit ("ECU") in any Volvo model.

An embodiment of the present inventive apparatus is illustrated in FIG. 1. In particular, FIG. 1 is a front view illustrating a diagnostic tool 100 according to an embodiment of the invention. The diagnostic tool 100 can be any computing device, such as, for example, the Nemisys diagnostic tool from Service Solutions (a unit of the SPX Corporation) in Owatonna, Minn. The diagnostic tool 100 includes a housing 102 to house the various components of the diagnostic tool, such as a display 104, a user interface 106, a power key 108, a memory card reader 110 and a connector interface 112. The display 104 can be any display, for example, LCD (liquid crystal display), VGA (video graphics array), touch display (can also be a user interface), etc. The user interface 106 allows the user to interact with the diagnostic tool in order to operate the diagnostic tool as desired. The user interface 106 can include function keys, arrow keys or any other type of keys that can manipulate the diagnostic tool 100 in order to operate various menus that are presented on the display. The input device 106 can also be a mouse or any other suitable input device, including a keypad. The user interface 106 can also include numbers or be alphanumeric. The power key 108 allows the user to turn the diagnostic tool 100 on and off, as required.

Memory card reader 110 can be a single type card reader, such as a compact flash card, floppy disc, memory stick, secure digital, flash memory or other types of memory. The memory card reader 110 can be a reader that reads more than one of the aforementioned memory such as a combination memory card reader. Additionally, the card reader 110 can also read any other computer readable medium, such as CD, DVD, UMD, etc.

The connector interface 112 allows the diagnostic tool 100 to connect to an external device, such as an ECU of a vehicle, a computing device, an external communication device (such as a modem), a network, etc. through a wired or wireless connection. Connector interface 112 can also include a USB, FIREWIRE, modem, RS232, RS485, and other connections to communicate with external devices, such as a hard drive, USB drive, CD player, DVD player, UMD player or other computer readable medium devices.

Figure 2:
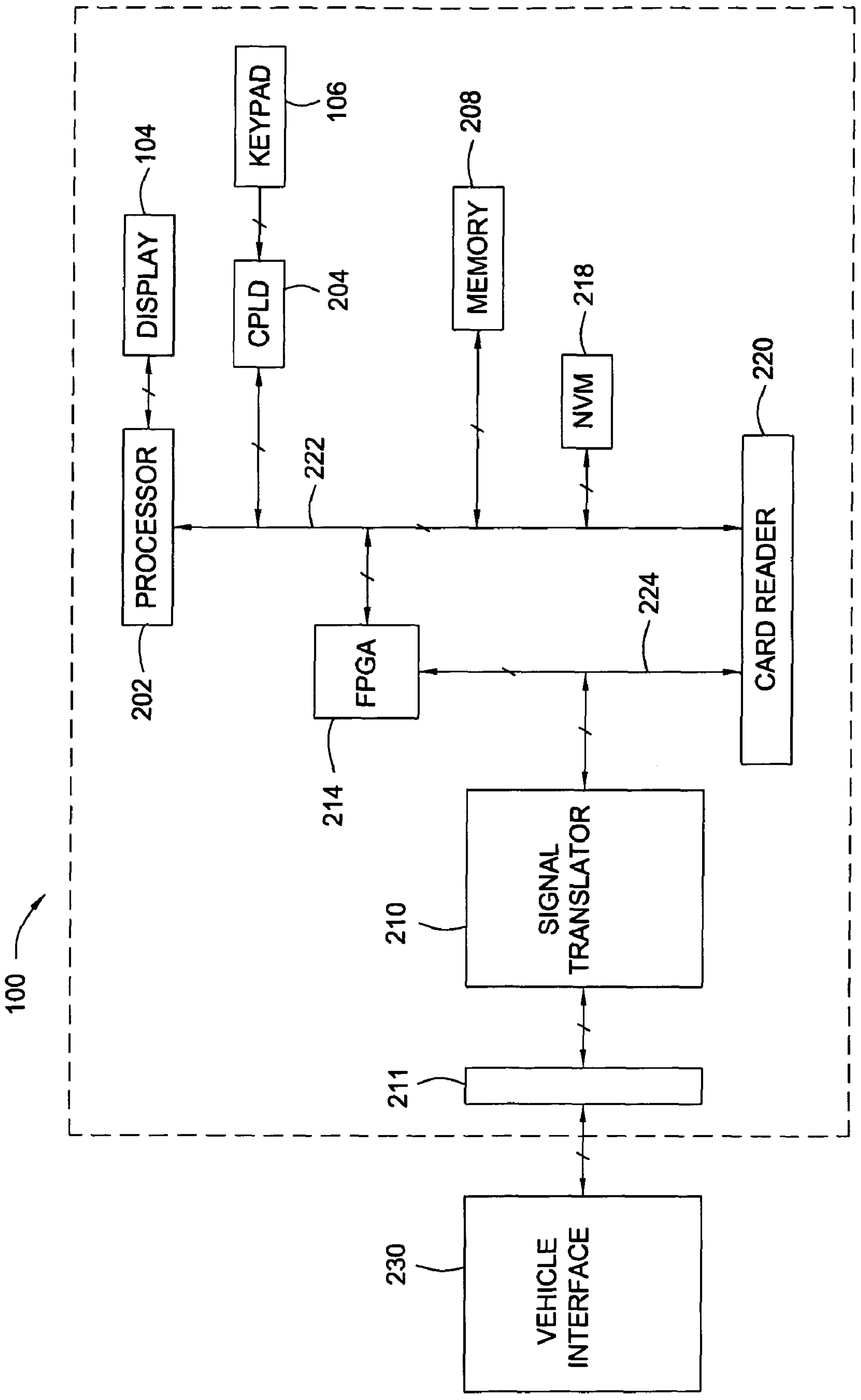
FIG. 2 is a block diagram of the components of a diagnostic tool.

FIG. 2 is a block diagram of the components of the diagnostic tool 100. In FIG. 2, the diagnostic tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory 218, a card reader 220, a second system bus 222, a connector interface 211, and a selectable signal translator 210. A vehicle communication interface 230 is in communication with the diagnostic tool 100 through connector interface 211 via an external cable (not shown).

Selectable signal translator 210 communicates with the vehicle communication interface 230 through the connector interface 211. Signal translator 210 conditions signals received from an ECU unit through the vehicle communication interface 230 to a conditioned signal compatible with diagnostic tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4) or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by diagnostic tool 100 to connect diagnostic tool 100 to vehicle communication interface 230. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of diagnostic tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory subsystem 208, including any database. The database related to Volvo or other vehicles can be part of the software that operates the tool or can be stored separately. In this embodiment, the database will contain information regarding the various Volvo models and their ECU components.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

Figure 3:
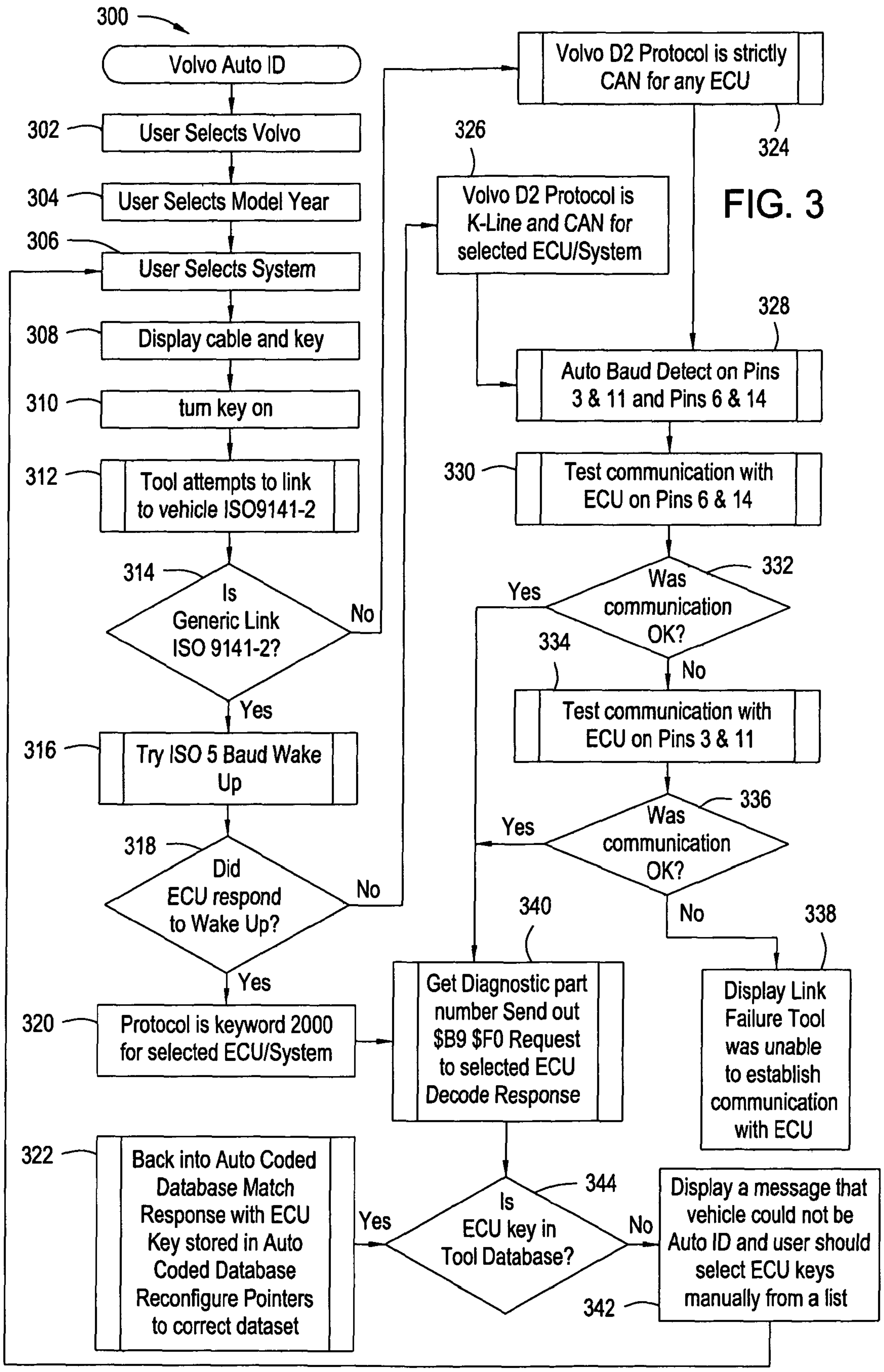
FIG. 3 is a flowchart illustrating steps that may be followed in accordance with one embodiment of the invention.

FIG. 3 is a flowchart 300 illustrating steps that may be followed in accordance with one embodiment of the invention. Volvo protocols include Keyword 2000 or CAN and it can be difficult to determine which communication protocol is being utilized in a particular Volvo model. This invention can also be used with other communication protocols and Keyword 2000 and CAN are but examples. At step 302, the user selects Volvo as the manufacturer and the model from a list of manufactures in the tool's database. At step 304, the user selects the model year associated with the vehicle under test. Next, at step 306, the user selects the diagnostic system he wishes to evaluate, such as ABS, airbag, PCM, TCM and other systems.

After the system is selected, the diagnostic tool displays the appropriate equipment to use, such as what cable and key to use, at step 308. The key is required so that the cable can make the correct connection with a data link connector (DLC) in the vehicle. The DLC is a port located inside a vehicle, usually near the dashboard, that can be coupled to the diagnostic tool 100 via the connector interface 112 of the diagnostic tool 100, to allow the vehicle to communicate with the diagnostic tool 100. Commonly the DLC has 16 pins that are numbered and serve various purposes. At step 310, the user is instructed to turn the vehicle's key on, thus powering up the various ECUs in the vehicle. At this point, user interaction is ceased until the tool determines the ECU diagnostic part number or lets the user know that it could not determine the ECU diagnostic part number.

At step 312, the diagnostic tool 100 will now automatically attempt to determine the ECU diagnostic part number of the system that the user previously selected. Thus, at step 312, the tool attempts to communicate using the protocol ISO 9141-2. Under this standard, the rate of transmission of data is about 10.4 kbs. By using this protocol, the tool can determine if a certain pin or pin 7 is active on the DLC. Thus, at step 314, the diagnostic tool 100 checks to determine if it successfully communicated with the vehicle.

If there was successful communication or yes through ISO 9141-2, then at step 316, the diagnostic tool attempts the ISO 5 Baud "Wake Up." At step 318, the diagnostic tool 10 determines whether the ECU responded to the "Wake Up."

If the ECU responds to the "Wake Up," then at step 320, the tool knows that the ECU selected by the user is using Keyword 2000 and the baud rate is also readily determined. The diagnostic tool 100 proceeds to step 340, as discussed below.

However, if at step 318, the ECU does not respond to the diagnostic tool's "Wake-Up" signal, then it is not known for certain what protocol and baud rate that diagnostic system is using. Therefore, the tool proceeds to step 326 where it is likely that the protocol being used in the vehicle is CAN. In this instance the baud rate is not known and must be determined by the tool.

Similarly, if at step 314, the vehicle does not communicate with the diagnostic tool using ISO 9141-2, then it is known that the vehicle uses CAN. The tool then proceeds to step 324, where the baud rate must be determined. CAN is not normally active and has to be activated using Keyword 2000. With Keyword 2000, the tool can activate a relay switch so that CAN communication can be initiated with the vehicle by sending a signal on pin 7.

CAN may be low speed or high speed depending on the Baud rate that they communicate with. Baud rates below 125 kbs is considered low speed while any Baud rates above 250 kbs is high speed. Other Baud rates can include 500 kbs, 1 Mbs or higher. Thus, the diagnostic tool must determine at what Baud rate the ECU is communicating at. As such, the process moves to step 328 (from steps 324 and 326) where the diagnostic tool 100 passively listens for the Baud rate being used on pins 6 and 14 and pins 3 and 11 located on the diagnostic link connector. Pins 6 and 14 are typically high speed and pins 3 and 11 are low speed.

Therefore, at step 330, the diagnostic tool determines whether it is able to communicate on pins 6 and 14. At step 332, the tool determines if communication was successful. If communication is successful, then the tool proceeds to step 340. However, if communication is not successful, the diagnostic tool 100 proceeds to step 334, where it attempts to communicate via pins 3 and 11. The diagnostic tool 100 then determines whether communication through 3 and 11 is successful, at step 336. If communication is successful, then the tool proceeds to step 340. However, if communication is not successful, the tool proceeds to step 338, where the diagnostic tool 100 displays a message regarding the inability to successfully communicate with the ECU. This may indicate to the technician that there may be hardware problems preventing the diagnostic tool 100 from successfully communicating with the vehicle under test.

Upon successful communication with the ECU, either by means of Keyword 2000 or CAN, the method proceeds to step 340 where the diagnostic tool 100 obtains the diagnostic part number or ECU key (8 digits plus 3 characters) and ECU complete part number (10 digits plus 3 characters). At step 340, the tool knows what communication protocol is utilized and at what Baud rate by the ECU. Once the diagnostic part number is obtained, the diagnostic tool 100, at step 344, compares it with an internal database of Volvo diagnostic part numbers to determine if the part number obtained from the ECU is present in the database. The database can contain either the diagnostic part number or the ECU complete part number. Thus, by retrieving both the diagnostic part number and the ECU complete part number, the tool can have a conduct a better match of the ECU.

If the diagnostic part number obtained is in the diagnostic tool's internal database the tool proceeds to step 322 where the part number is matched with the part number stored in the database and the pointers in the software will be reconfigured, if necessary, to the right dataset in the database. However, if the diagnostic part number is not in the database, a message is displayed at step 342, that informs the technician that the part number could not be matched in the database. Thereafter, the tool returns to step 306 and a list of available part numbers is displayed and the technician choose among them. The tool can also present to the user the closest matching part numbers in order to help the user narrow the list of potential ECUs.

The above described method is done in the tool via software, however, hardware or hardware and software combination to carry out the method is also contemplated. All the steps described here do not have to be performed in order, variations of the order of the steps are also contemplated.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for identifying a vehicle's protocol, comprising:

a processor that operates a software that automatically identifies the vehicle's protocol used by an electronic control unit of a diagnostic system in a vehicle under test and software used by the electronic control unit, wherein the processor attempts to communicate with the vehicle with a first communication protocol, the processor identifies a second communication protocol as the vehicle's protocol used by the electronic control unit when the first communication protocol is unsuccessful, and the processor identifies a third communication protocol as the vehicle's protocol used by the electronic control unit when the first communication protocol is successful;

a memory that stores the software used by the processor;

a connector interface that connects the tool to a data link connector in the vehicle;

a signal translator that allows the tool to communicate with the vehicle in at least one communication protocol;

an input device for inputting information into the tool; and a display that displays information to a user.

2. The diagnostic tool of claim 1 further comprising a database containing information regarding the electronic control unit and its associated software in the vehicle.

3. The diagnostic tool of claim 1, wherein the processor is configured to determine a part number for the electronic control unit for a system selected by the user and compares the part number to a database of electronic control units.

4. A method for identifying a vehicle's protocol, comprising:

coupling a diagnostic tool to a vehicle;

selecting at least one diagnostic system in the vehicle to query via a menu presented by the diagnostic tool;

automatically communicating with a first electronic control unit with the diagnostic tool using a first communication protocol;

automatically communicating with a second electronic control unit using a second communication protocol with the diagnostic tool when communicating with the first communication protocol is unsuccessful;

automatically communicating with the second electronic control unit using a third communication protocol with the diagnostic tool when communicating with the first communication protocol is successful; and identifying the second electronic control unit and the second electronic control unit's software from a database.

5. The method of claim 4 further comprising requesting a part number of the second electronic control unit and matching the part number with the database.

6. The method of claim 4 further comprising determining the Baud rate of the communication protocol when communicating with the first communication protocol or the second communication protocol is successful.

7. The method of claim 4, wherein the first communication protocol is ISO 9141 and the second communication protocol is CAN.

8. The method of claim 5, wherein if the diagnostic tool can not successfully match the part number in the database, then the diagnostic tool presents the part number to the user so the user can select the second electronic control unit manually from the database.

9. The method of claim 4, wherein when the first communication protocol is successful, the tool automatically looks up the second electronic control unit in the database and attempts to communicate with the second electronic control unit by sending a communication signal to determine the second electronic control unit's Baud rate.

10. The method of claim 9, wherein if the second electronic control unit responds to the communication signal, then the diagnostic tool requests the part number of the second electronic control unit.

11. The method of claim 9, wherein if the second electronic control unit does not respond to the communication signal, the diagnostic tool determines the proper communication protocol is CAN.

12. The method of claim 6, wherein the Baud rate is determined by communicating on pins 3 and 11 or 6 and 14 of a data link connector.

13. The method of claim 4, wherein if the first communication is successful, the third communication protocol used by the second electronic control unit is Keyword 2000.

14. An article comprising a machine-accessible medium having associated data, wherein the data, when accessed, results in a machine performing:

providing at least one diagnostic system in a vehicle to query via a menu presented by a diagnostic tool;

automatically communicating with a first vehicle onboard computer with the diagnostic tool using a first communication protocol after receiving the selection of the diagnostic system;

automatically communicating with a second vehicle onboard computer using a second communication protocol with the diagnostic tool when communicating with the first communication protocol is unsuccessful;

automatically communicating with the second vehicle onboard computer using a third communication protocol with the diagnostic tool when communicating with the first communication protocol is successful; and identifying the second vehicle onboard computer and the second vehicle onboard computer's software from a database.

15. The article of claim 14, wherein the first communication protocol is ISO 9141 and the second communication protocol is CAN.

16. The article of claim 14, wherein if the first communication protocol is not successful, then the second communication protocol used by the second vehicle onboard computer is CAN.

17. The article of claim 14, wherein if the first communication protocol is successful, the second communication protocol used by the second vehicle onboard computer is Keyword 2000.

18. The article claim 14 further comprising requesting a part number of the second vehicle onboard computer and matching the part number with the database.

19. The article of claim 14 further comprising determining a Baud rate of the communication protocol when communicating with the first communication protocol or the second communication protocol is successful.

20. The article of claim 18, wherein if the diagnostic tool can not successfully match the part number in the database, then the diagnostic tool presents the part number to a user so the user can select the second vehicle onboard computer manually from the database.

21. The article of claim 14, wherein when the first communication protocol is successful, the tool automatically looks up the second vehicle onboard computer in the database and attempts to communicate with the second vehicle onboard computer by sending a communication signal.

22. The article of claim 21, wherein if the second vehicle onboard computer responds to the communication signal, then the tool requests the part number of the second vehicle onboard computer.

23. The article of claim 21, wherein if the second vehicle onboard computer does not respond to the communication signal, the tool determines the proper communication protocol is CAN.

24. A method for identifying a vehicle's protocol, comprising:

coupling a diagnostic tool to a vehicle;

selecting at least one diagnostic system in the vehicle to query via a menu presented by the diagnostic tool;

automatically communicating with a first electronic control unit with the diagnostic tool using ISO 9141;

automatically communicating with a second electronic control unit using controller area network with the diagnostic tool when communicating with ISO 9141 is unsuccessful;

automatically communicating with the second electronic control unit using keyword 2000 with the diagnostic tool when communicating with ISO 9141 is successful; and identifying the second electronic control unit and the second electronic control unit's software from a database.

25. A diagnostic tool for identifying a vehicle's protocol, comprising:

a processor that operates a software that automatically identifies the vehicle's protocol and software used by an electronic control unit of a diagnostic system in a vehicle under test, wherein the processor attempts to communicate with the vehicle with a first communication protocol, the processor identifies a second communication protocol as the vehicle's protocol used by the electronic control unit when the first communication protocol is unsuccessful, and the processor identifies a third communication protocol as the vehicle's protocol used by the electronic control unit when the first communication protocol is successful, and wherein the processor is configured to determine a diagnostic part number of the electronic control unit and a complete part number of the electronic control unit for the diagnostic system;

a memory that stores the software used by the processor;

a connector interface that connects the diagnostic tool to a data link connector in the vehicle;

a signal translator that allows the diagnostic tool to communicate with the vehicle in at least one communication protocol;

an input device for inputting information into the diagnostic tool; and a display that displays information to a user.

26. The method of claim 4, further comprising:

determining the second communication protocol is the vehicle's protocol when communicating with the first communication protocol is unsuccessful; and determining the third communication protocol is the vehicle's protocol when communicating with the first communication protocol is successful.

27. The article of claim 14, further comprising:

determining the second communication protocol is the second vehicle onboard computer's protocol when communicating with the first communication protocol is unsuccessful; and determining the third communication protocol is the second vehicle onboard computer's protocol when communicating with the first communication protocol is successful.

* * * * *